(12) United States Patent
Shimazawa et al.

(10) Patent No.: US 8,345,048 B2
(45) Date of Patent: Jan. 1, 2013

(54) CHART DRAWING DEVICE AND CHART DRAWING METHOD

(75) Inventors: Ko Shimazawa, Tokorozawa (JP); Jun Tanaka, Yokohama (JP)

(73) Assignees: 1st Holdings, Inc., Tokyo (JP); Four-Clue Inc., Tokyo (JP)

( * ) Notice: Subject to any disclaimer, the term of this patent is extended or adjusted under 35 U.S.C. 154(b) by 0 days.

(21) Appl. No.: 13/142,808

(22) PCT Filed: Nov. 11, 2010

(86) PCT No.: PCT/JP2010/070071
§ 371 (c)(1),
(2), (4) Date: Jun. 29, 2011

(87) PCT Pub. No.: WO2011/059014
PCT Pub. Date: May 19, 2011

(65) Prior Publication Data
US 2011/0273453 A1  Nov. 10, 2011

(30) Foreign Application Priority Data
Nov. 11, 2009 (JP) ................................. 2009-257763

(51) Int. Cl.
*G06T 11/20* (2006.01)
*G09G 5/00* (2006.01)
(52) U.S. Cl. ........................................ 345/440; 345/629
(58) Field of Classification Search .................. 345/440, 345/440.1, 440.2, 629
See application file for complete search history.

(56) References Cited

U.S. PATENT DOCUMENTS

| | | | | |
|---|---|---|---|---|
| 5,283,596 A * | 2/1994 | Long | | 345/440.1 |
| 5,375,201 A * | 12/1994 | Davoust | | 715/201 |
| 5,488,698 A * | 1/1996 | Oliver et al. | | 358/1.11 |
| 5,550,964 A * | 8/1996 | Davoust | | 345/440 |
| 5,581,677 A * | 12/1996 | Myers et al. | | 345/440 |
| 5,666,477 A * | 9/1997 | Maeda | | 345/440 |
| 6,088,030 A * | 7/2000 | Bertram et al. | | 715/839 |
| 6,128,617 A * | 10/2000 | Lowry | | 1/1 |
| 6,326,987 B2 * | 12/2001 | Alexander | | 715/771 |
| 6,912,689 B1 * | 6/2005 | Revis | | 715/206 |
| 7,175,019 B2 * | 2/2007 | Beal et al. | | 206/6.1 |
| 7,176,850 B1 * | 2/2007 | Itoh et al. | | 345/9 |
| 7,348,995 B2 * | 3/2008 | Ericson | | 345/603 |
| 7,714,861 B1 * | 5/2010 | Ragucci | | 345/440 |
| 7,965,292 B2 * | 6/2011 | Buck | | 345/440.2 |
| 8,044,959 B2 * | 10/2011 | Buck | | 345/440.2 |

(Continued)

FOREIGN PATENT DOCUMENTS

JP      S62-227189      10/1987

(Continued)

*Primary Examiner* — M Good Johnson
(74) *Attorney, Agent, or Firm* — Connolly Bove Lodge & Hutz LLP (57) ABSTRACT

A displaying chart image in a bitmap format is generated from ledger sheet data, while identifying layout information capable of identifying a plurality of line drawings on the chart image respectively is generated for a mouse decision. Then, identifying information corresponding to a dot designated through a mouse cursor over the displaying chart image is acquired from the identifying layout information and a dot string indicated by the identifying information is specified as the line drawing. Consequently, it is possible to increase a display speed more greatly as compared with the case in which the line drawings are subjected to vector rendering and are thus displayed respectively, and to identify the line drawings in the chart image formed into a bitmap based on the identifying layout information, respectively.

8 Claims, 3 Drawing Sheets

U.S. PATENT DOCUMENTS

| | | | |
|---|---|---|---|
| 2001/0000964 A1* | 5/2001 | Alexander | 345/440 |
| 2004/0085318 A1* | 5/2004 | Hassler et al. | 345/440 |
| 2005/0183039 A1* | 8/2005 | Revis | 715/838 |
| 2005/0270311 A1* | 12/2005 | Rasmussen et al. | 345/677 |
| 2009/0073187 A1* | 3/2009 | Rampson et al. | 345/619 |
| 2009/0207188 A1* | 8/2009 | Koyama | 345/629 |
| 2009/0245339 A1* | 10/2009 | Obata | 375/226 |
| 2010/0020093 A1* | 1/2010 | Stroila et al. | 345/589 |

FOREIGN PATENT DOCUMENTS

| | | |
|---|---|---|
| JP | 11-134304 | 5/1999 |
| JP | 2006-120173 | 5/2006 |
| JP | 2007-328029 | 12/2007 |
| JP | 2008-232968 | 10/2008 |

* cited by examiner

CHART DRAWING DEVICE AND CHART DRAWING METHOD

CROSS REFERENCE TO RELATED APPLICATIONS

This application is a National Phase filing under 35 U.S.C. §371 of PCT/JP2010/070071 filed on Nov. 11, 2010; and this application claims priority to Application No. 2009-257763 filed in Japan on Nov. 11, 2009 under 35 U.S.C. §119; the entire contents of all are hereby incorporated by reference.

TECHNICAL FIELD

The present invention relates to a chart rendering apparatus and a chart rendering method, and more particularly to a suitable apparatus and method for rendering a chart image including a large number of line drawings.

BACKGROUND ART

Conventionally, there is provided an application capable of totalizing ledger sheet data stored every day and outputting the totalized data in a chart format. By outputting the data in the chart format which can easily be seen in place of a enumeration of numerals, it is possible to enhance an efficiency of totalizing activities, for instance, business transaction, sale, accounting, stock and the like. Some of the applications of this type are compatible with Web. Under the circumstances, FLASH (flash) to be plug-in software of browser is often used in the application which is compatible with the Web in order to render a chart.

In the case in which a chart is rendered with the FLASH, there is generally carried out vector rendering utilizing the LineTo function or the DrawRect function which is a method in the Graphics class. The vector rendering represents a rendering method based on a vector format expressed in parameter information about coordinates of a point and a line or face for connecting points, and is suitable for rendering a line drawing. When the vector rendering is carried out, however, a great calculating load is applied to a rendering process for forming information given as numeric data into an image by a calculation. For this reason, there is a problem in that a performance is considerably deteriorated when a large number of line drawings are rendered.

In order to avoid the deterioration in the performance, there is generally used a method of successively transferring a large number of line drawings subjected to the vector rendering onto bitmap data. For instance, in the case in which a chart formed by a large number of polygonal lines is rendered, vector rendering utilizing a method in the Graphics class is first carried out to generate a first one of the polygonal lines. The first polygonal line is transferred onto the bitmap data to form an image. Then, contents of the Graphics class are cleared to execute the same process for a second one of the polygonal lines. In the same manner, a large number of polygonal lines are rendered with the bitmap data. Thus, the contents of the Graphics class are cleared at each time to reduce rendering information. Consequently, an operating speed can be prevented from being adversely influenced irrespective of the number of the polygonal lines to be rendered.

As a bad effect caused by forming a large number of polygonal lines into the bitmap, however, there is an operational problem in that a position of a mouse cursor cannot be decided. For instance, when the mouse cursor is put on a line or a point over a chart, it is impossible to carry out an action such as a highlight display of the selected line or a label display of the selected point (a display of ledger sheet information to be original data for generating a chart or the like). The reason is that there is no conception of a line or a point over data because a chart formed into the bitmap is a single image as a whole.

There is proposed the technique for displaying an eye pattern generated in a bitmap format from sample data on a measured signal and operating a mouse to select an optional point on an eye pattern display region, thereby highlight displaying a waveform passing through the selected point (for instance, see Patent Ledger sheet 1). However, the Patent Ledger sheet 1 does not disclose a concrete method related to how to decide a position of a mouse cursor over an image formed into a bitmap. Therefore, an implementing method is unknown.

[Patent Ledger sheet 1] Japanese Laid-Open Patent Publication No. 2008-232968

DISCLOSURE OF THE INVENTION

The invention has been made to solve the problems and has an object to enable an enhancement in a display speed also in the case in which a chart image including a large number of line drawings is displayed, and a decision of a position of a mouse cursor also over a chart image formed into a bitmap in order to increase the display speed.

In order to attain the object, in the invention, a chart image in a bitmap format is generated from a plurality of numeric data and a displaying chart image is generated from the chart image, while identifying layout information is generated for a mouse decision. The identifying layout information is obtained by giving identifying information capable of identifying a plurality of line drawings on the chart image respectively to corresponding dots to the line drawings over the same two-dimensional layout as the chart image. Then, the identifying information corresponding to the dot designated over the displaying chart image displayed on a display device is acquired from the identifying layout information and a dot string indicated by the identifying information thus acquired is specified as the line drawing.

According to the invention having the structure described above, the chart including the line drawings is generated and displayed as a bitmap image. As compared with the case in which the line drawings are subjected to vector rendering and are thus displayed respectively, therefore, it is possible to remarkably increase an operating speed in the case in which the line drawings are rendered. Consequently, a chart image including a large number of line drawings can also be rendered at an extremely high speed.

According to the invention, furthermore, a conception of a position of the line drawing included in the chart image is constituted based on the identifying layout information generated separately from the chart image. Consequently, it is possible to identify the line drawings in the chart image, respectively. Thus, it is possible to specify a line drawing in a position in which a dot is designated over a chart image formed into a bitmap.

BEST MODE FOR CARRYING OUT THE INVENTION

Figure 1:
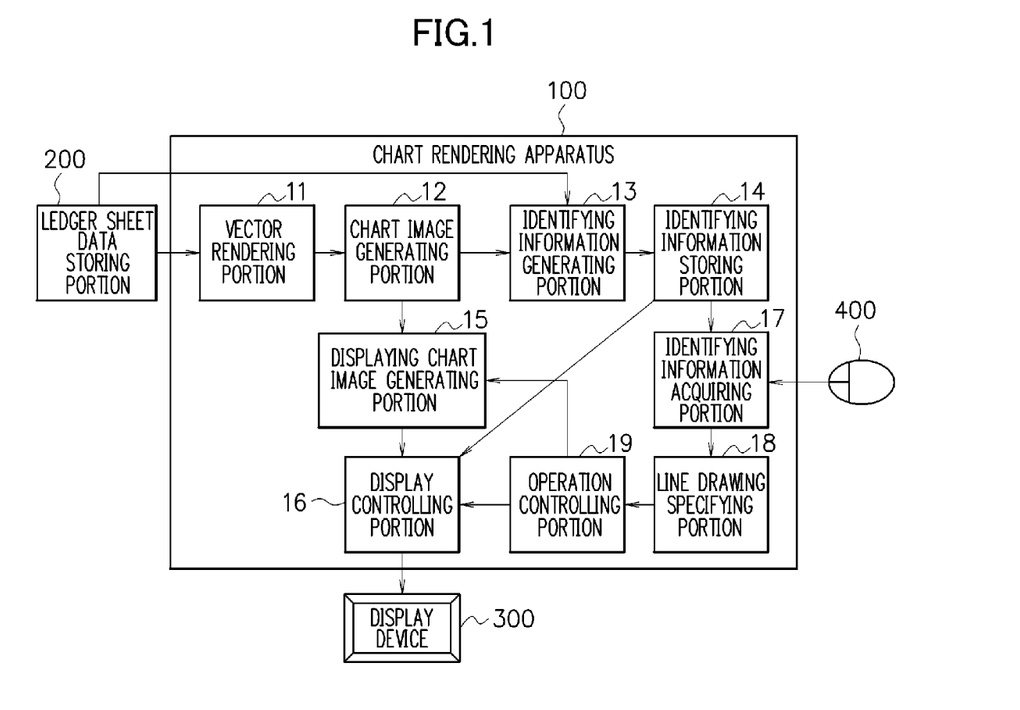
FIG. 1 is a block diagram showing an example of a functional structure of a chart rendering apparatus according to the embodiment.

An embodiment according to the invention will be described below with reference to the drawings. FIG. 1 is a block diagram showing an example of a functional structure of a chart rendering apparatus 100 according to the embodiment. The chart rendering apparatus 100 according to the embodiment includes, as the functional structure, a vector rendering portion 11, a chart image generating portion 12, an identifying information generating portion 13, an identifying information storing portion 14, a displaying chart image generating portion 15, a display controlling portion 16, an identifying information acquiring portion 17, a line drawing specifying portion 18 and an operation controlling portion 19.

The functional blocks can also be implemented by any of a hardware configuration, DSP (Digital Signal Processor) and software. For instance, in the case in which the functional blocks are implemented in the software, the chart rendering apparatus 100 according to the embodiment actually includes a CPU or an MPU, an RAM, an ROM or the like in a computer and can be implemented through an operation of a program stored in the RAM or the ROM.

The vector rendering portion 11 uses a plurality of ledger sheet data (numeric data) stored in a ledger sheet data storing portion 200 to successively carry out vector rendering over a plurality of line drawings by utilizing the LineTo function or the DrawRect function which is a method in the Graphics class. The chart image generating portion 12 successively transfers the line drawings subjected to the vector rendering by the vector rendering portion 11 onto bitmap data, thereby generating a chart expressing the line drawings in a color difference as an image in a bitmap format.

Figure 2:
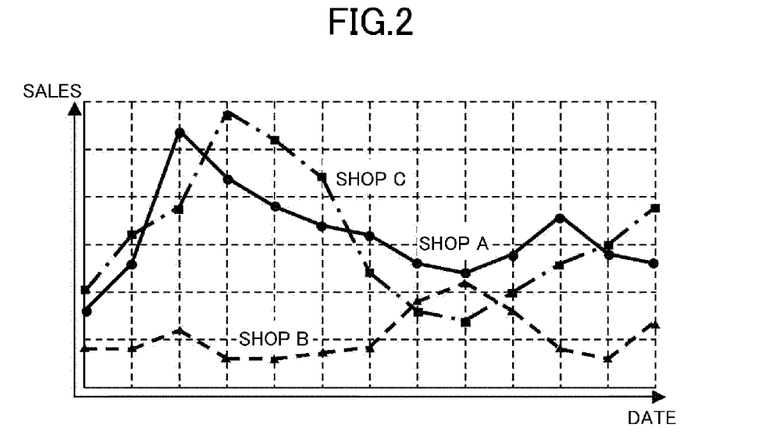
FIG. 2 is a graph showing an example of a chart image rendered by the chart rendering apparatus according to the embodiment.

For instance, in the case in which a chart image formed by a plurality of polygonal lines (line drawings) shown in FIG. 2 is rendered, the vector rendering portion 11 first carries out the vector rendering over a first one of the polygonal lines by utilizing the method in the Graphics class. Then, the chart image generating portion 12 transfers the first polygonal line onto the bitmap data, thereby forming an image. Thereafter, the vector rendering portion 11 clears contents of the Graphics class to carry out the vector rendering over a second one of the polygonal lines. Subsequently, the chart image generating portion 12 transfers the second polygonal line onto the bitmap data, thereby forming an image. The same processes are repeated to generate a chart image obtained by rendering the polygonal lines in a bitmap.

The identifying information generating portion 13 generates identifying information capable of identifying the line drawings over the chart image generated by the chart image generating portion 12 based on the chart image, and generates identifying layout information in which the identifying information is given to each of dots corresponding to the line drawings over the same two-dimensional layout as the chart image. In the embodiment, color information is used as the identifying information for the dot which is generated by the identifying information generating portion 13. The identifying information generating portion 13 stores the identifying layout information thus generated in the identifying information storing portion 14.

The identifying information generating portion 13 generates two types of identifying layout information. One of them is line identifying layout information and the other is point identifying layout information. The former line identifying layout information serves to identify lines of the line drawings. Moreover, the latter point identifying layout information serves to identify discrete points over the line drawings.

In other words, the identifying information generating portion 13 generates line identifying layout information in which identifying information (color information) is given to each of the dots corresponding to the lines of the line drawings over the same two-dimensional layout as the chart image generated by the chart image generating portion 12. Moreover, the identifying information generating portion 13 similarly generates point identifying layout information in which identifying information (color information) is given to each of the dots corresponding to the discrete points over the line drawings on the same two-dimensional layout as the chart image.

The discrete points constituting the respective dots in the point identifying layout information are plotted by ledger sheet data themselves. For instance, in the case in which the ledger sheet data are sales data stored every day for each shop and a chart image in FIG. 2 generated based on the ledger sheet data represents a time series sales transition for each shop (an axis of abscissa indicates a date and an axis of ordinate indicates sales), the discrete point is equivalent to a point obtained by plotting sales for each shop every date. The identifying information generating portion 13 reads ledger sheet data corresponding to each of the plot points (a name of the shop, the date, the sales and the like) from the ledger sheet data storing portion 200 when generating the point identifying layout information and stores, in the identifying information storing portion 14, the ledger sheet data as conditional information in which the color information is set to be an ID.

Figure 3A:
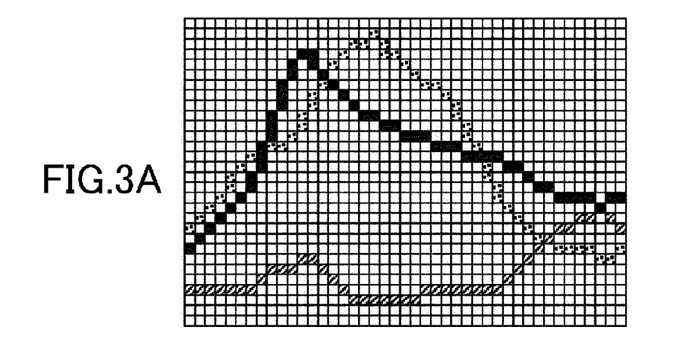
FIGS. 3A and 3B are diagrams showing an example of partial structures of line identifying layout information and point identifying layout information which are generated from the chart image illustrated in FIG. 2.
Figure 3B:
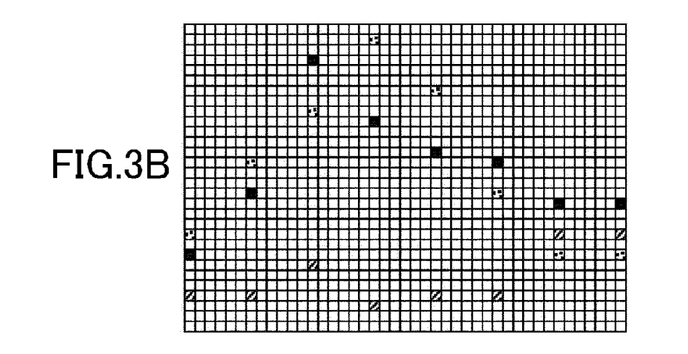

FIGS. 3A and 3B are diagrams showing an example of partial structures of the line identifying layout information and the point identifying layout information which are generated from the chart image illustrated in FIG. 2. FIG. 3A shows the line identifying layout information and FIG. 3B shows the point identifying layout information. In FIG. 3, each square indicates a dot. A position of each dot in the identifying layout information has a one-to-one correspondence to that of each dot in the chart image. A portion shown in hatching of each square indicates a dot constituting a line drawing, and hatching of a different type indicates a different line drawing.

The identifying information generating portion 13 gives color information varied for each line drawing as identifying information to the dot shown in the hatching of FIG. 3. At this time, the identifying information generating portion 13 gives the color information corresponding to the respective line drawings to a dot having a plurality of line drawings overlapping with each other over the chart image (which will be hereinafter referred to as a crossing dot), thereby generating the identifying layout information. For convenience of the Figure, the crossing dot is shown in hatching of only one type. However, the different color information corresponding to the line drawings are actually given respectively.

The color information corresponding to the hatching illustrated for the crossing dot is acquired by the identifying information acquiring portion 17 which will be described below. More specifically, it is assumed that the color information corresponding to the hatching illustrated for the crossing dot is color information corresponding to any of the line drawings crossing each other at the crossing dot which is finally formed into a bitmap by the chart image generating portion 12. Although order for forming the line drawings into the bitmap basically depends on order for arranging the ledger sheet data stored in the ledger sheet data storing portion 200, it can also be rearranged optionally by a designation of a user.

Figure 4:
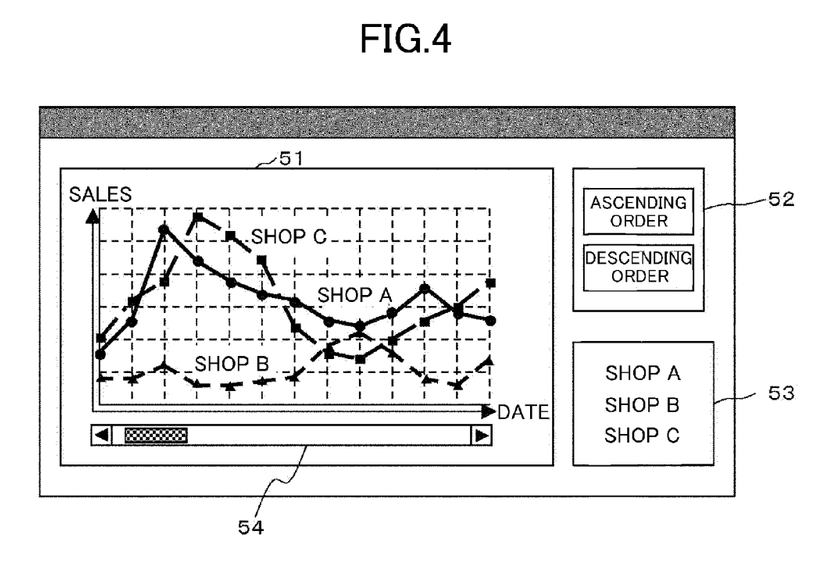
FIG. 4 is a view showing an example of a display screen according to the embodiment.

For instance, as shown in FIG. 4, a display device 300 is caused to display a screen including a sort button 52 in addition to a window 51 for displaying a chart image and the user operates the sort button 52 through a mouse 400 to rearrange the order for forming the line drawings into the bitmap. Alternatively, the display device 300 may be caused to display a screen including a shop name list 53 corresponding to the line drawings in addition to the window 51 for displaying the chart image and the user may operate the mouse 400 to optionally exchange the order for arranging the shop name, thereby rearranging the order for forming the line drawings into the bitmap.

When the order for forming the line drawings into the bitmap is rearranged, thus, the vector rendering portion 11, the chart image generating portion 12 and the identifying information generating portion 13 are operated again in accordance with the rearranged order and generate the identifying layout information again in new arranging order. Consequently, any of the color information given to the crossing dot which is acquired by the identifying information acquiring portion 17 is changed into color information corresponding to any of the line drawings crossing each other at the crossing dot which is finally formed into a bitmap by the chart image generating portion 12 in new set order.

The color information of each dot in the identifying layout information generated by the identifying information generating portion 13 is color information in which similar colors within a predetermined range are formed into an identical color group. It is assumed that the similar colors can be rarely identified by human eyes and can be identified through a computer. The identifying information generating portion 13 gives color information about the similar colors belonging to the identical color group to each dot corresponding to a single line drawing. In that case, the identifying information generating portion 13 gives at least the color information about the similar colors which are different from each other to the respective dots (the respective dots shown in FIG. 3B) corresponding to discrete points over a single line drawing.

In other words, the dots shown in hatching of FIG. 3B correspond to the discrete points on the line drawings included in the chart image, all of the color information given to the respective dots are different from each other irrespective of the dots over the different line drawings or the dots over the same line drawing. On the other hand, referring to the dots shown in the hatching of FIG. 3A, the color information about the similar colors belonging to the identical color group are given to the dots over the same line drawing, and the color information about non-similar colors are given to the dots over the different line drawings. All of the color information about the similar colors given to the respective dots over the same line drawing may be different from each other. In this case, all of the color information given to the respective dots in the hatching portion constituting the line identifying layout information are different from each other.

Returning to FIG. 1, the other functional blocks will be described below. The displaying chart image generating portion 15 generates a displaying chart image based on the chart image generated by the chart image generating portion 12. In the displaying chart image, a line drawing is expressed in a different color from a color indicated by the color information used as the identifying information in the identifying layout information generated by the identifying information generating portion 13.

As described above, the color information to be used in the identifying layout information includes color information about colors which can be rarely identified by human eyes and can be identified through a computer. On the other hand, the displaying chart image generating portion 15 generates a displaying chart image in which the line drawings are distinguished from each other by using only the colors which can be identified by the human eyes. At the crossing dots where the line drawings cross each other, moreover, the displaying chart image generating portion 15 generates a displaying chart image obtained by rendering any of the line drawings crossing each other at the crossing dot which is finally formed into a bitmap by the chart image generating portion 12.

The display controlling portion 16 carries out a control to cause the display device 300 to display the displaying chart image of the bitmap which is generated by the displaying chart image generating portion 15. The identifying information acquiring portion 17 acquires the identifying information (color information) corresponding to the dot designated by the cursor of the mouse 400 over the displaying chart image displayed on the display device 300 through the display controlling portion 16 from the identifying layout information stored in the identifying information storing portion 14. The identifying layout information has the same configuration as bitmap data in which the color information is given to each of the dots in the two-dimensional layout. Therefore, it is possible to acquire the color information by using the getPixcel function in the BitmapData class.

In the case in which the dot designated by the mouse cursor corresponds to the discrete point shown in FIG. 3B, the identifying information acquiring portion 17 acquires the color information from the point identifying layout information. On the other hand, in the case in which the dot designated by the mouse cursor corresponds to the point on the line drawing shown in FIG. 3A other than the discrete points shown in FIG. 3B, the identifying information acquiring portion 17 acquires the color information from the line identifying layout information.

In the case in which the dot designated by the mouse cursor is a crossing dot at which a plurality of line drawings overlaps with each other over the chart image, the identifying information acquiring portion 17 acquires one of the color information given to the crossing dot. In the embodiment, it is assumed to acquire color information corresponding to any of the line drawings crossing each other at the crossing dot which is finally formed into a bitmap by the chart image generating portion 12 (color information corresponding to hatching illustrated for the crossing dot in FIG. 3).

As described above, the order for forming the line drawings into the bitmap by the chart image generating portion 12 based on the ledger sheet data stored in the ledger sheet data storing portion 200 can be optionally changed by the designation of the user. By rearranging the order for forming the line drawings into the bitmap, it is possible to vary the color information of the crossing dot to be acquired by the identifying information acquiring portion 17.

In the case in which the dot designated by the mouse cursor corresponds to the discrete point shown in FIG. 3B, the line drawing specifying portion 18 specifies, as a point on the line drawing, the dot indicated by the color information acquired through the identifying information acquiring portion 17 based on the point identifying layout information stored in the identifying information storing portion 14. On the other hand, in the case in which the dot designated by the mouse cursor corresponds to the point on the line drawing shown in FIG. 3A other than the discrete points shown in FIG. 3B, the line drawing specifying portion 18 specifies, as a line drawing, a dot string indicated by color information belonging to an identical color group to the color information acquired through the identifying information acquiring portion 17 based on the line identifying layout information stored in the identifying information storing portion 14.

When (a line of) a line drawing is specified by the line drawing specifying portion 18, the operation controlling portion 19 carries out a control to perform a first predetermined operation related to the specified line drawing. For instance, the operation controlling portion 19 controls the displaying chart image generating portion 15 and the display controlling portion 16 in order to highlight display the line drawing specified by the line drawing specifying portion 18. More specifically, the displaying chart image generating portion 15 renders the displaying chart image again in such a manner that the line drawing specified by the line drawing specifying portion 18 appears in a specific highlight color over a forefront surface upon receipt of the control of the operation controlling portion 19. Then, the display controlling portion 16 causes the display device 300 to display a displaying chart image rendered again by the displaying chart image generating portion 15.

On the other hand, when a point on a line drawing is specified by the line drawing specifying portion 18, the operation controlling portion 19 controls the display controlling portion 16 in order to carry out a second predetermined operation related to the specified point. For instance, the operation controlling portion 19 carries out a label display for the specified point (a display of ledger sheet data corresponding to the specified point or the like). More specifically, the display controlling portion 16 acquires the ledger sheet data such as a shop name, a date or sales corresponding to the specified point from the identifying information storing portion 14 (which are stored in relation to the color information in the point identifying layout information as described above) upon receipt of the control of the operation controlling portion 19, and label displays the ledger sheet data in an overlap with the displaying chart image generated by the displaying chart image generating portion 15.

Figure 5:
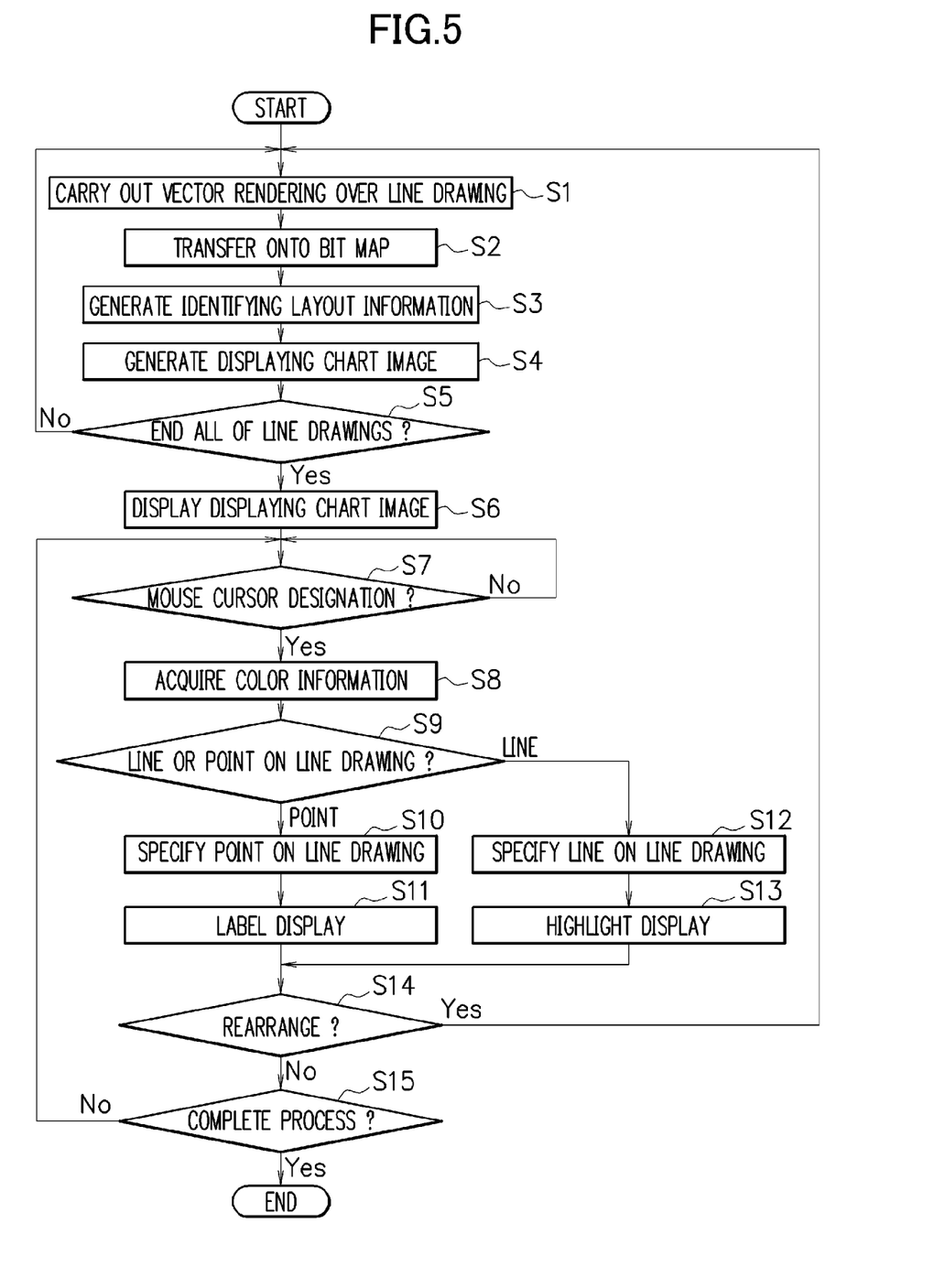
FIG. 5 is a flowchart showing an example of an operation of the chart rendering apparatus according to the embodiment.

Next, description will be given to an operation of the chart rendering apparatus 100 according to the embodiment having the structure described above. FIG. 5 is a flowchart showing an example of the operation of the chart rendering apparatus 100 according to the embodiment. The flowchart of FIG. 5 is started when the chart rendering apparatus 100 is activated to give an instruction for displaying a chart image.

In FIG. 5, first of all, the vector rendering portion 11 uses a plurality of ledger sheet data stored in the ledger sheet data storing portion 200 to carry out vector rendering over a first line drawing (Step S1). Next, the chart image generating portion 12 transfers, onto bitmap data, the first line drawing subjected to the vector rendering by the vector rendering portion 11, thereby generating a chart image (Step S2).

Furthermore, the identifying information generating portion 13 generates line identifying layout information and point identifying layout information related to the first line drawing based on the chart image generated by the chart image generating portion 12, and stores them in the identifying information storing portion 14 (Step S3). Subsequently, the displaying chart image generating portion 15 generates a displaying chart image based on the chart image generated by the chart image generating portion 12 (Step S4).

Then, the vector rendering portion 11 decides whether all of line drawings to be rendered are processed or not by using the ledger sheet data stored in the ledger sheet data storing portion 200 (Step S5). If any of the line drawings to be rendered is still left, the process returns to the Step S1. At this time, the vector rendering portion 11 clears contents of the Graphics class generated in the rendering of the first line drawing.

Thereafter, the vector rendering portion 11 carries out the vector rendering over a second line drawing based on the ledger sheet data stored in the ledger sheet data storing portion 200 (Step S1). Next, the chart image generating portion 12 transfers, onto the bitmap data, the second line drawing subjected to the vector rendering by the vector rendering portion 11, thereby generating a chart image (Step S2).

Furthermore, the identifying information generating portion 13 generates line identifying layout information and point identifying layout information related to the second line drawing based on the chart image generated by the chart image generating portion 12, and additionally stores them in the identifying information storing portion 14 (Step S3). Subsequently, the displaying chart image generating portion 15 generates a displaying chart image based on the chart image generated by the chart image generating portion 12 (Step S4). More specifically, the second line drawing is superposed on the first line drawing to generate the displaying chart image.

Then, the vector rendering portion 11 decides whether all of the line drawings to be rendered are processed or not by using the ledger sheet data stored in the ledger sheet data storing portion 200 (Step S5). If any of the line drawings to be rendered is still left, the process returns to the Step S1 and identifying layout information related to the line drawings are generated and the displaying chart image including the line drawings is generated in the same manner.

If it is decided that the process for all of the line drawings to be rendered is ended at the Step S5, that is, the identifying layout information and the displaying chart image are completed, the display controlling portion 16 causes the display device 300 to display the displaying chart image generated by the displaying chart image generating portion 15 (Step S6).

In a state in which the displaying chart image is displayed on the display device 300, the identifying information acquiring portion 17 decides whether a position is designated by the mouse cursor over the chart image or not (Step S7). If the position is designated by the mouse cursor over the chart image, the identifying information acquiring portion 17 acquires, from the identifying layout information, color information corresponding to a dot designated by the mouse cursor (Step S8). At this time, if the dot designated by the mouse cursor corresponds to a discrete point on a line drawing, the identifying information acquiring portion 17 acquires color information from the point identifying layout information. On the other hand, if the dot designated by the mouse cursor corresponds to a point on the line drawing (a point other than the discrete points), the identifying information acquiring portion 17 acquires color information from the line identifying layout information.

Next, the line drawing specifying portion 18 decides whether the dot designated by the mouse cursor is a dot corresponding to the discrete point on the line drawing or the other point on the line drawing (Step S9). This can be decided depending on whether the color information is acquired from the line identifying layout information or the point identifying layout information by the identifying information acquiring portion 17.

If the dot designated by the mouse cursor corresponds to the discrete point on the line drawing, the line drawing specifying portion 18 specifies, as a point on the line drawing, a dot indicated by the color information acquired through the identifying information acquiring portion 17 based on the point identifying layout information stored in the identifying information storing portion 14 (Step S10). Then, the operation controlling portion 19 controls the display controlling portion 16 to carry out a label display for ledger sheet data related to the specified point (Step S11).

On the other hand, if the dot designated by the mouse cursor corresponds to a point on the line drawing (a point other than the discrete points), the line drawing specifying portion 18 specifies, as a line drawing, a dot string indicated by color information about similar colors belonging to the identical color group to the color information acquired through the identifying information acquiring portion 17 based on the line identifying layout information stored in the identifying information storing portion 14 (Step S12). Then, the operation controlling portion 19 controls the displaying chart image generating portion 15 and the display controlling portion 16 to highlight display the specified line drawing (Step S13).

Next, the vector rendering portion 11 decides whether an instruction for rearranging order for forming the line drawings into a bitmap is given by the user or not (Step S14). If it is decided that the instruction for the rearrangement is given, the process returns to the Step S1. In this case, the processes from the Step S1 to the Step S5 are repetitively executed in accordance with the rearranged order so that the identifying layout information and the displaying chart image are generated again. Then, the displaying chart image thus regenerated is displayed on the display device 300 again (Step S6).

On the other hand, if the instruction for rearranging the order for forming the line drawings into the bitmap is not given by the user, the chart rendering apparatus 100 decides whether an instruction for ending the operation is given by the user or not (Step S15). If the instruction for ending the operation of the chart rendering apparatus 100 is not given, the process returns to the Step S7. On the other hand, if the instruction for ending the operation of the chart rendering apparatus 100 is given, the process of the flowchart in FIG. 5 is ended.

As described above in detail, in the embodiment, the chart image in the bitmap format is generated from the ledger sheet data and the displaying chart image in the bitmap format is generated from the chart image, while the identifying layout information in the bitmap format obtained by giving the color information capable of identifying the line and the point of the line drawing over the chart image to each dot corresponding to the line drawing is generated for the mouse decision. Then, the color information corresponding to the dot designated by the mouse cursor over the displaying chart image is acquired from the identifying layout information, the dot string indicated by the acquired color information is specified as the line of the line drawing or the dot indicated by the acquired color information is specified as the point of the line drawing.

According to the chart rendering apparatus 100 in accordance with the embodiment which is thus constituted, the chart including a plurality of line drawings is generated and displayed as the bitmap image. As compared with the case in which the line drawings are subjected to the vector rendering and are thus displayed respectively, therefore, it is possible to considerably increase an operating speed in the rendering of the line drawings. Consequently, a chart image including a large number of line drawings can also be rendered at an extremely high speed.

If a large number of line drawings are present, some parts cannot be seen due to an overlap. However, it is also possible to change how to see a chart image instantaneously by rearranging overlapping order (rearranging the order for forming the line drawings into a bitmap). In some cases in which an axis of ordinate or an axis of abscissa of the chart image is long and cannot be completely displayed over a single screen, moreover, a display area is moved through a manipulation of a scroll bar 54 as shown in FIG. 4, for instance. Also in these cases, it is possible to follow the scroll, thereby redisplaying a chart image in a different area instantaneously.

According to the chart rendering apparatus 100 in accordance with the embodiment, furthermore, the conception of the positions of the line drawings included in the chart image is constituted based on the identifying layout information generated separately from the displaying chart image so that the line drawings in the chart image can be identified respectively. Consequently, it is also possible to specify any of the line drawings in a position on which the mouse cursor is put over the chart image formed into the bitmap. In the embodiment, particularly, two types of identifying layout information are generated for the line identification and the point identification, and the dots on the same line drawing are not set to be the same color information but are identified in similar colors which are different from each other. Consequently, it is possible to simply specify the line drawing, and furthermore, to distinguish and specify the line and the point over the line drawing.

The line identifying layout information and the point identifying layout information can also be generated depending on uses. In other words, in the case of an application which is sufficient for identifying only the line of the line drawing, presence of only the line identifying layout information is enough. In this case, it is preferable to use the same color information for the same line drawing and it is not necessary to form an identical color group by similar colors. In the case of an application which is sufficient for identifying only the point of the line drawing, moreover, presence of only the point identifying layout information is enough.

In the embodiment, furthermore, coordinate information is not acquired through the mouse 400 but the color information is acquired from the identifying layout information in order to decide the position of the mouse cursor. In a method of acquiring the coordinate information through the mouse 400, it is necessary to acquire each coordinate information through the mouse 400 of an external device every time the cursor is slightly moved. Consequently, a great deal of time is taken.

On the other hand, by using the method of acquiring the color information from the identifying layout information in an inner part as in the embodiment, it is possible to follow the movement of the mouse cursor, thereby acquiring the color information instantaneously. Therefore, it is possible to enhance a display speed by forming the chart image into the bitmap and displaying the bitmap, and furthermore, to considerably increase a speed for deciding the position of the mouse. Consequently, it is possible to extremely improve a serial performance for displaying the chart image and then deciding the position of the mouse, and thereafter carrying out a highlight display or the like for a line drawing thus specified.

Although the description has been given to the example in which the color information corresponding to the respective line drawings crossing each other at the crossing dot are given thereto to generate the identifying layout information in the embodiment, the invention is not restricted thereto. For instance, it is also possible to give only any of the color information corresponding to the line drawings crossing each other at the crossing dot which is finally formed into the bitmap through the chart image generating portion 12. Alternatively, it is also possible to give only any of the color information which corresponds to the line drawing designated optionally by a user.

Although the description has been given to the example in which the highlight display for a line drawing is carried out when a line on the line drawing is specified through the designation of the mouse cursor, and the label display is carried out when a point on the line drawing is specified in the embodiment, moreover, an action to be performed when the line or point on the line drawing is specified is not restricted to the example. In other words, it is possible to carry out an optional operation depending on uses of an application. For instance, it is possible to erase a display of a specified line drawing from a displaying chart image.

Although the description has been given to the example in which the color information is used as the identifying information constituting the identifying layout information in the embodiment, moreover, the invention is not restricted thereto. In other words, it is also possible to use information other than the color information if it can identify a plurality of line drawings included in the chart image (preferably a line and a point on the line drawing) respectively.

Although the description has been given by taking the polygonal line shown in FIG. 2 as an example of the line drawing in the embodiment, moreover, a type of the line drawing is not restricted thereto. For instance, the invention can also be applied to a bar chart, a circle graph, a radar chart, a bar graph or the like.

Although the description has been given to the example in which the dot on the displaying chart image is designated by means of the cursor of the mouse 400 in the embodiment, moreover, the invention is not restricted thereto. For instance, a touch panel may be provided in the display device 300 to designate a dot on a displaying chart image through a touch pen or a finger touch with respect to the touch panel.

In addition, all of the embodiments are only illustrative for a concreteness in order to execute the invention and the technical scope of the invention should not be thereby construed to be restrictive. In other words, the invention can be carried out in various forms without departing from the spirit or the main features thereof.

INDUSTRIAL APPLICABILITY

The invention can be utilized for a chart rendering apparatus and a chart rendering method which render a chart image including a large number of line drawings.

The invention claimed is:

1. A chart rendering apparatus comprising:
a chart image generating portion for generating a chart expressing a plurality of line drawings in a color difference as an image in a bitmap format from a plurality of numeric data;
an identifying information generating portion for generating identifying information capable of identifying the line drawings on the chart image generated by the chart image generating portion based on the chart image and generating identifying layout information obtained by giving the identifying information to dots corresponding to the line drawings over the same two-dimensional layout as the chart image respectively;
a displaying chart image generating portion for generating a displaying chart image based on the chart image generated by the chart image generating portion;
a display controlling portion for causing a display device to display the displaying chart image generated by the displaying chart image generating portion;
an identifying information acquiring portion for acquiring identifying information corresponding to any of the dots designated over the displaying chart image displayed by the display controlling portion from the identifying layout information; and
a line drawing specifying portion for specifying, as the line drawing, a dot string indicated by the identifying information acquired through the identifying information acquiring portion;
wherein the identifying information generating portion gives each of the identifying information corresponding to the respective line drawings to any of the dots which has the line drawings overlapping with each other over the chart image, thereby generating the identifying layout information, and
wherein the identifying information acquiring portion acquires one of the identifying information given to the designated dot if the dot has the line drawings overlapping with each other over the chart image.

2. The chart rendering apparatus according to claim 1, wherein the display controlling portion highlight displays the line drawing specified by the line drawing specifying portion.

3. The chart rendering apparatus according to claim 1, wherein the identifying information of each of the dots generated by the identifying information generating portion is color information.

4. The chart rendering apparatus according to claim 1, wherein the identifying information generating portion generates line identifying layout information obtained by giving the identifying information to the respective dots corresponding to lines of the line drawings over the same two-dimensional layout as the chart image generated by the chart image generating portion and point identifying layout information obtained by giving the identifying information to the respective dots corresponding to discrete points on the line drawings over the same two-dimensional layout as the chart image generated by the chart image generating portion, and
the line drawing specifying portion specifies, as the line drawing, the dot string indicated by the identifying information acquired through the identifying information acquiring portion based on the line identifying layout information and specifies, as a point on the line drawing, the dot indicated by the identifying information acquired through the identifying information acquiring portion based on the point identifying layout information.

5. The chart rendering apparatus according to claim 4, wherein the identifying information of each of the dots which is generated by the identifying information generating portion is color information in which similar colors within a predetermined range are formed into an identical color group, and the identifying information generating portion gives the color information about the similar colors belonging to the identical color group to each of the dots which corresponds to the single line drawing and gives at least the color information about the similar colors which are different from each other to each of the dots corresponding to the discrete points over the single line drawings at that time, thereby generating the line identifying layout information and the point identifying layout information, and
the line drawing specifying portion specifies, as the line drawing, a dot string indicated by the color information belonging to the identical color group to the color information acquired through the identifying information acquiring portion based on the line identifying layout information, and specifies, as a point on the line drawing, the dot indicated by the color information acquired through the identifying information acquiring portion based on the point identifying layout information.

6. The chart rendering apparatus according to claim 5, further comprising an operation controlling portion for carrying out a control to perform a first predetermined operation when specifying the line drawing through the line drawing specifying portion and carrying out a control to perform a second predetermined operation when specifying a point on the line drawing through the line drawing specifying portion.

7. A chart rendering method comprising:
- a chart image generating step of causing a chart image generating portion of a chart rendering apparatus to generate a chart expressing a plurality of line drawings in a color difference as an image in a bitmap format from a plurality of numeric data stored in a ledger sheet data storing portion;
- an identifying information generating step of causing an identifying information generating portion of the chart rendering apparatus to generate identifying information capable of identifying the line drawings on the chart image generated at the chart image generating step based on the chart image respectively and to generate identifying layout information obtained by giving the identifying information to respective dots corresponding to the line drawings over the same two-dimensional layout as the chart image and to store the identifying layout information in an identifying information storing portion;
- a displaying chart image generating step of causing a displaying chart image generating portion of the chart rendering apparatus to generate a displaying chart image based on the chart image generated at the chart image generating step;
- a displaying step of causing a display controlling portion of the chart rendering apparatus to display the displaying chart image generated at the displaying chart image generating step on a display device;
- an identifying information acquiring step of causing an identifying information acquiring portion of the chart rendering apparatus to acquire, from the identifying layout information stored in the identifying information storing portion, identifying information corresponding to any of the dots which is designated over the displaying chart image displayed on the display device;
- a line drawing specifying step of causing a line drawing specifying portion of the chart rendering apparatus to specify, as the line drawing, a dot string indicated by the identifying information acquired at the identifying information acquiring step; and
- a highlight displaying step of causing the display controlling portion to highlight display of the line drawing specified at the line drawing specifying step;
- wherein the identifying information generating step comprises the steps of giving each of the identifying information corresponding to the respective line drawings to any of the dots which has the line drawings overlapping with each other over the chart image, thereby generating the identifying layout information, and
- wherein the identifying information acquiring step comprises the steps of acquiring one of the identifying information given to the designated dot if the dot has the line drawings overlapping with each other over the chart image.

8. The chart rendering apparatus according to claim 1, wherein the display controlling portion highlight displays the line drawing specified by the line drawing specifying portion.

* * * * *